April 9, 1935.  O. H. BANKER  1,996,790
AUTOMATIC CHANGE SPEED TRANSMISSION MECHANISM
Filed Nov. 3, 1932  7 Sheets-Sheet 3

Inventor
Oscar H. Banker
By
Searles & French
Attorneys

April 9, 1935.　　　　O. H. BANKER　　　　1,996,790
AUTOMATIC CHANGE SPEED TRANSMISSION MECHANISM
Filed Nov. 3, 1932　　　7 Sheets-Sheet 6

Inventor
Oscar H. Banker
By
Charles & French
Attorneys

April 9, 1935. O. H. BANKER 1,996,790
AUTOMATIC CHANGE SPEED TRANSMISSION MECHANISM
Filed Nov. 3, 1932 7 Sheets-Sheet 7

Inventor
Oscar H. Banker
By Marles & French
Attorneys

UNITED STATES PATENT OFFICE 1,996,790

AUTOMATIC CHANGE SPEED TRANSMISSION MECHANISM

Oscar H. Banker, Chicago, Ill., assignor to New Products Corporation, Chicago, Ill., a corporation of Delaware Application November 3, 1932, Serial No. 640,989

18 Claims. (Cl. 74—260)

The invention relates to automatic change speed transmission mechanisms.

In prior transmissions of the character above described where an automatic clutch mechanism is used to connect the engine with the transmission such clutch mechanisms were constantly subjected to the variations of speeds and influences of centrifugal force so that when the car speed was reduced to such an extent that the full driving torque was insufficient to hold the clutch in engagement at that particular speed the clutch slipped and the engine raced making it very aggravating or unpleasant for the driver. According to the present invention the disagreeable effects of the prior engine clutch mechanisms have been overcome in that the clutch is gradually and smoothly brought in full driving engagement but after this full driving engagement is established the clutch will remain engaged without losing its driving torque capacity even under a considerable reduction in engine speed so that slipping of the clutch and racing of the motor in the slower speeds of the vehicle is prevented but when a critical low speed is reached the clutch will be definitely and positively released.

Another improvement of this invention resides in the simplified arrangement and connection of the second speed clutch mechanism with its drive shaft whereby the second speed automatic clutch as a unit is loosely mounted on one of the drive shafts and is adapted to be connected with its drive shaft by a manually operable clutch member which is completely disconnected when the transmission is in neutral and certain disadvantages and complications of the construction of my prior application Ser. No. 552,860 filed July 24, 1931, are avoided and reverse drive may be easily effected. Furthermore, in the present construction the clutch shoes are applied at a predetermined speed and the torque capacity of the clutch is constant regardless of the speed of the vehicle or engine at the time of engagement and a certain amount of slippage and cushioning action of the clutch shoes may take place before said shoes are positively engaged and they will remain engaged until a considerable reduction in speed takes place from the speed at which they engaged.

Another improvement of this invention resides in the simplified and novel arrangement, construction and connection of the automatic clutch connecting the gearing with the driven shaft for direct drive whereby the operator may go from second to direct drive at high speed or may go from low directly to direct drive at a low speed and thus eliminate second speed, and whereby he may readily release this automatic clutch while in direct drive at high speed and proceed in second or return to high if he desires, these operations being accomplished smoothly and without clashing or grinding of the clutch elements, the supersensitiveness of previous spring clutches and the objectionable inertia forces set up by the floating drum of previous constructions having been eliminated. The ability of the present arrangement to change from low to direct immediately without going through second at a low speed is a great advantage to the driver when proceeding in congested traffic and where he does not like to be in gear, it being noted that no special operation of levers or clutches is necessary with this construction.

Another advantage of the present invention over previous devices is that due to the complete disconnection of the second speed clutch mechanism and the other parts of the transmission in the neutral position, the transmission can be put back into low gear at practically any car speed. Thus, while the vehicle is in high gear at any speed the operator may bring the transmission into neutral position and then by applying the brake to the planetary gear carrier to stop its revolution immediately put the transmission in the low gear and by maintaining this brake in engagement the transmission will be in low gear regardless of how fast the vehicle may travel. In previous constructions the transmission was not completely in neutral position and the engine was not positively disconnected from the car due to the planetary action of the unit system herein used where the controls were operated to put the transmission in neutral when the vehicle was travelling at a high rate of speed and this was objectionable for if the piston of the engine should seize or any other engine trouble develop there was no positive means at the control of the operator whereby the complete disconnection of the car could be made at high speeds. This objection has been overcome by the present arrangement which makes it possible for the driver by shifting into neutral to completely disconnect the engine from the vehicle regardless of how fast the car is travelling.

Another object of the invention is to improve upon the lubrication of the transmission which in the present arrangement is accomplished by providing an independent oil pump and a circulation system from this pump to the gearing and shafts of the transmission and its return to the pump so that the oil for the gearing will not be contaminated with impurities of the engine oil.

Referring to the drawings.

Fig. 7 is a detail sectional view taken on the broken line 7—7 of Fig. 6;

Figure 1:
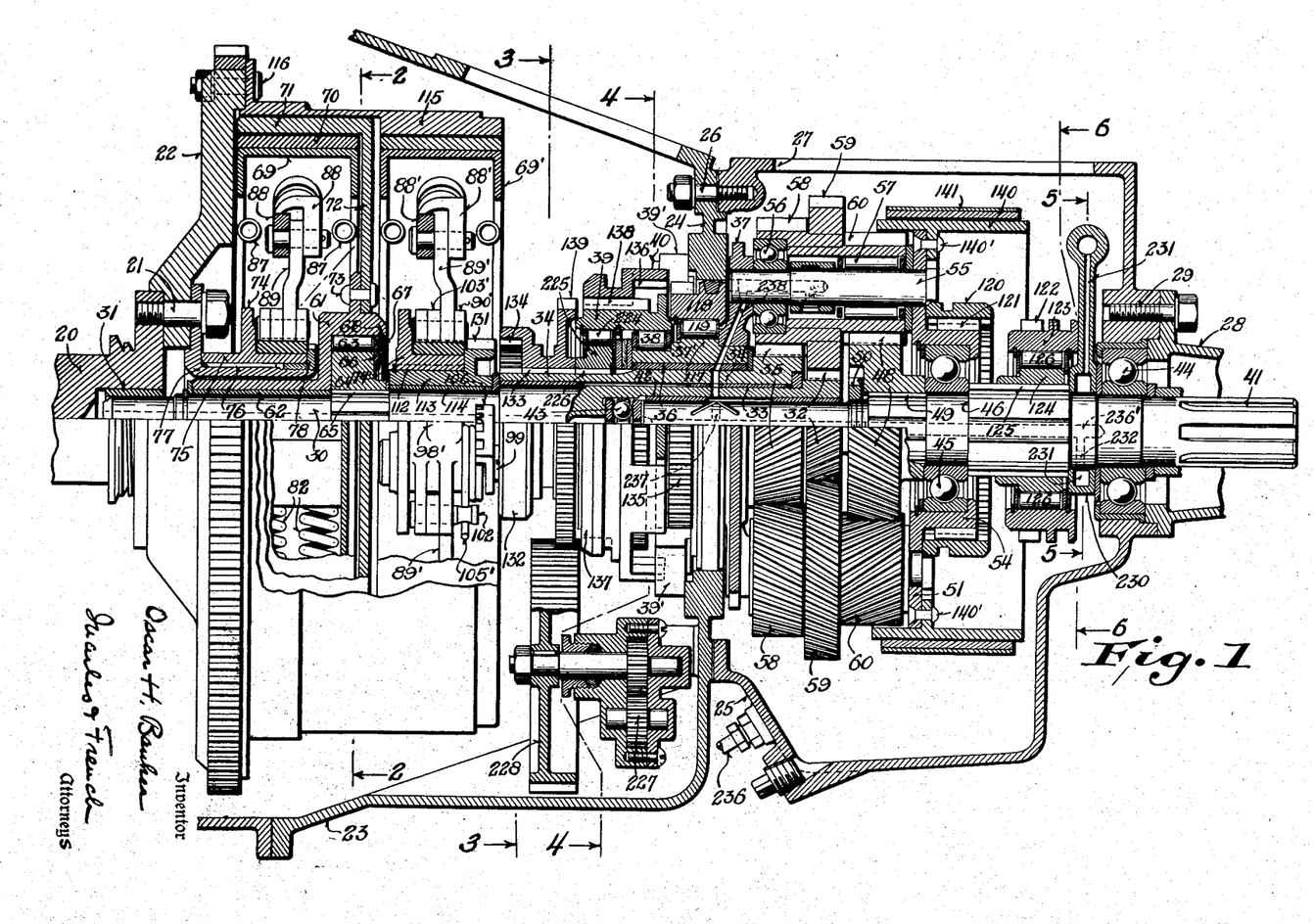
Fig. 1 is a vertical sectional view taken through the housing of the transmission with the lower half of most of the rotating parts shown in full while the upper half shows a central vertical sectional view through the transmission mechanism.

Referring to the drawings, and more particularly to Fig. 1, the numeral 20 designates the engine drive shaft or crank shaft of the engine connected by bolts 21 to the flywheel 22 of the engine enclosed in the usual engine crank case to which a housing section 23 of the transmission is detachably secured in any suitable manner, said section 23 having an end plate portion 24 to which the casing section 25 is secured by bolts 26. Section 25 has an opening 27 in the top adapted to be covered over by a removable cover plate and has a coupling housing 28 (a part of which is shown) secured to the end thereof by bolts 29.

A drive shaft 30 has one end journalled in the bushed bore 31 of the crank shaft and has a gear 32 at its other end formed integral therewith or connected thereto and at this end is journalled in the bushed bore 33 of the hollow or tubular drive shaft 34 provided with a gear 35 and in turn journalled in a bearing 36 of the part 37 of the planet gear carrier which part in turn has a hub portion 37' journalled in the roller bearing 38 whose rollers are mounted within an outer ring 39. This outer ring 39 has radially disposed arms 39' secured to the end plate 24 by socket headed bolts 40.

A driven shaft 41 has one end journalled in the bushed bore 42 in the shaft 30 and spaced from the inner end of said bore by a ball thrust bearing 43 and its other end journalled in the ball bearing 44 on the outer end of section 25. The inner race of a ball bearing 45 abuts a shoulder 46 of this shaft.

The shaft 41 has a driven gear 48 splined to it, as at 49, and is secured against endwise movement between the inner race of bearing 45 and a suitably locked nut 50.

Figures 5, 6:
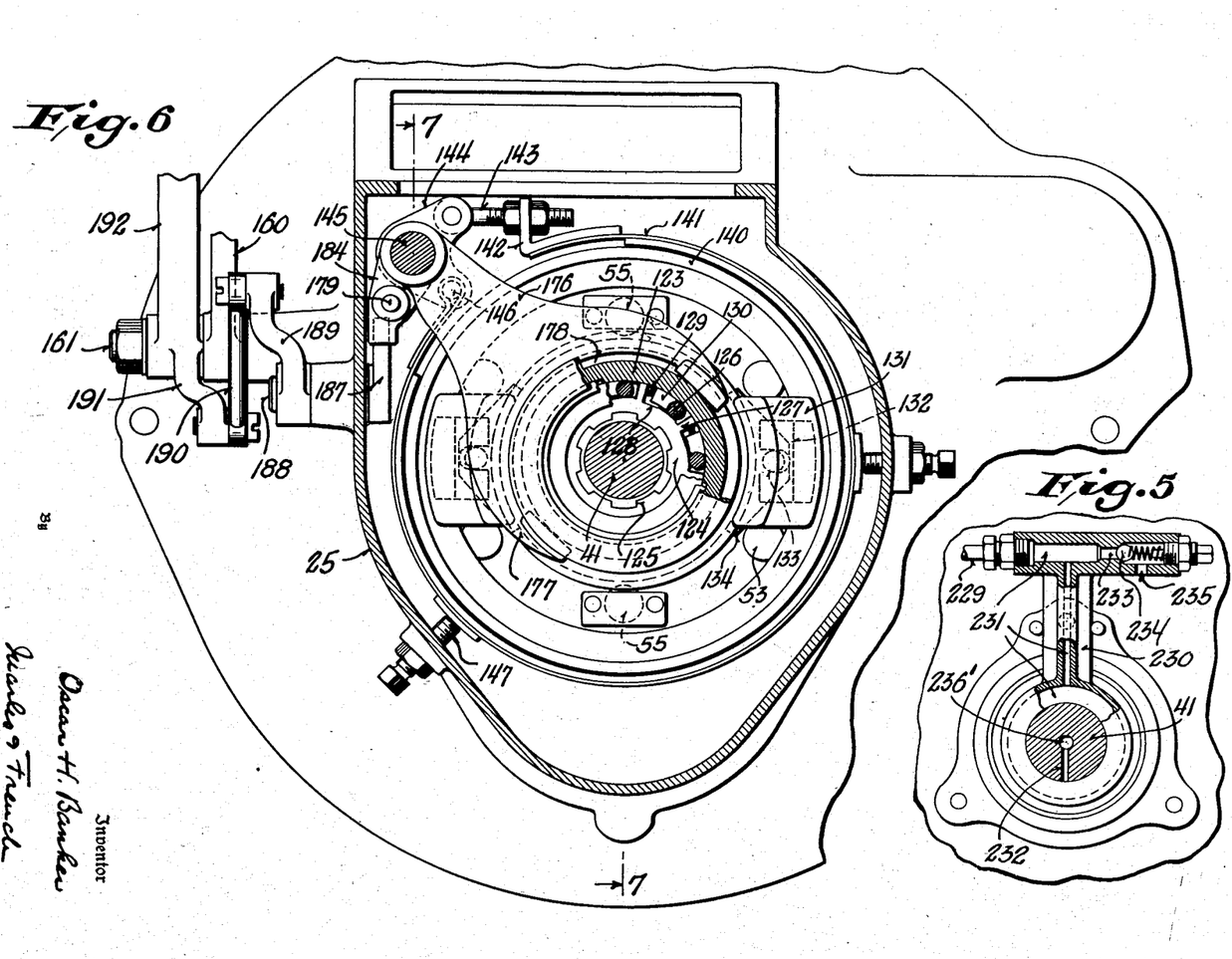
Fig. 5 is a detail vertical sectional view taken on the line 5—5 of Fig. 1.
Fig. 6 is a detail vertical sectional view taken on the line 6—6 of Fig. 1.

The planetary gear carrier in addition to the part 37 includes a spider or flanged disk 51 which is secured to the part 37 by stud bolts 53, see Figs. 7 and 6. The hub 54 of the disk 51 is journalled on the bearing 45.

The parts 37 and 51 have planet gear shafts 55 secured thereto carrying a ball bearing 56 at one end and a roller bearing 57 at the other upon which the hubs of the compound planet gears 58, 59 and 60 are mounted, these gears being preferably separately formed spiral gears whose hubs are rigidly secured together to provide a hub portion cooperating with said bearings 56 and 57. Gears 58, 59 and 60 mesh respectively with the gears 35, 32 and 48.

With the above arrangement, low speed is obtained when the gear 32 is the driver and the planet gear carrier is held against rotation, the drive then being from the shaft 30 through gears 32, 59, 60 and 48 to the driven shaft 41; second speed when the gear 35 is the driver and the planet gear carrier is held against rotation, the drive then being from the shaft 34, through gears 35, 58, 60 and 48; high speed when the planet carrier and its gears revolve with the shafts 30 and 34; and reverse is obtained when the planetary gear carrier is allowed to rotate freely and the shaft 34 held against rotation while the gear 32 meshing with the gear 59 drives the planetary gear carrier around gear 35 in an anticlockwise direction and thus through the gear 60 drives the gear 48 and the shaft 41 in the reverse direction to that of the shaft 30, and at a speed of about low gear ratio.

For obtaining the drive from the engine shaft 20, I preferably employ a speed responsive clutch mechanism which is associated with a one-way roller clutch or overrunning clutch comprising a clutch drum 61 whose hub has a bearing bushing 62 surrounding a portion of the shaft 30. This overrunning clutch has a set of clutch rollers 63 cooperating with the drum 61 and with an actuator 64 splined at 65 to the shaft 30. The construction of this clutch is similar to that hereinafter described and shown in Fig. 6. The rollers 63 are secured in operative position against endwise movement by an annular ring 66 secured in position by a split ring 67 adapted to engage an annular groove 68 in the drum 61.

Figures 2, 8, 15:
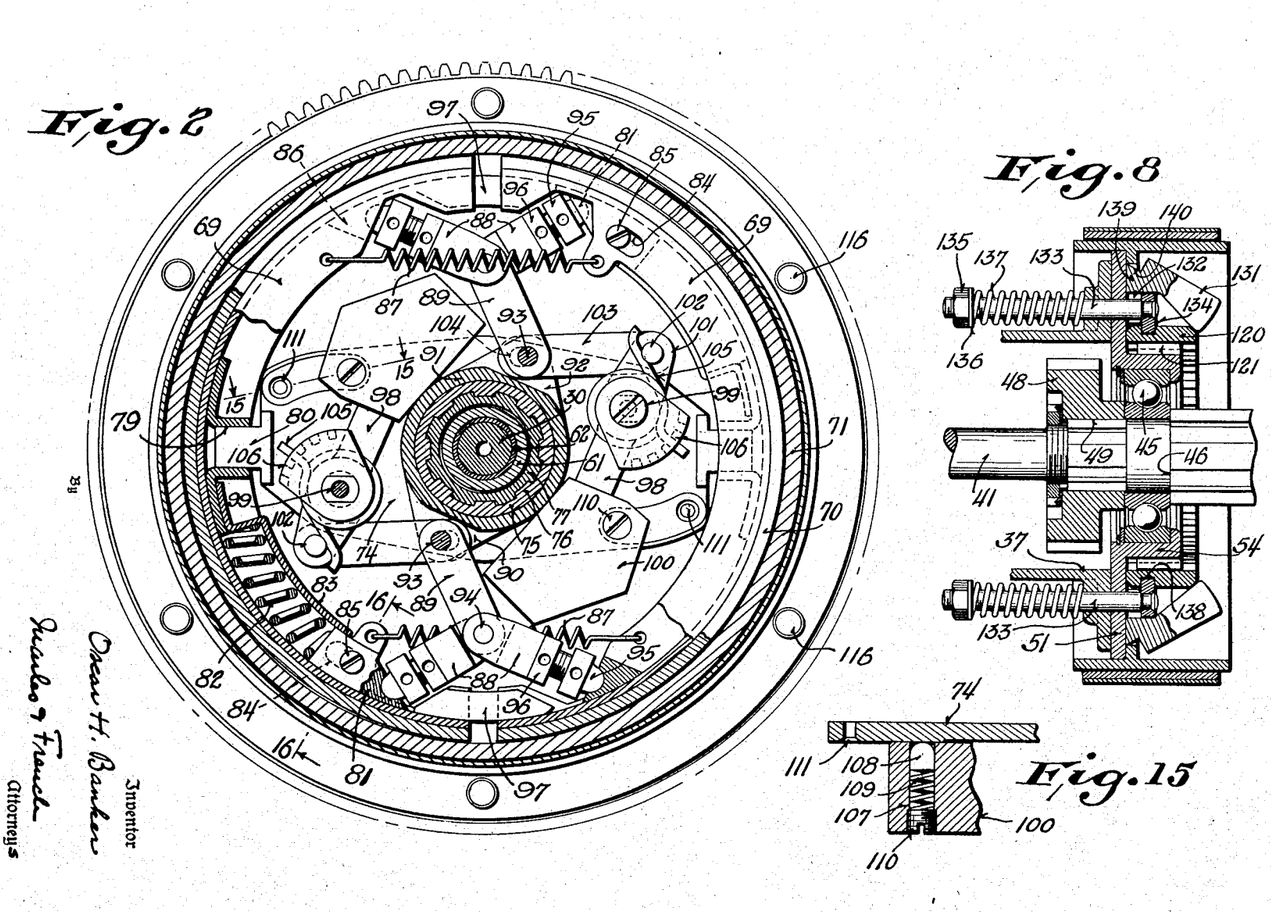
Fig. 2 is a detail vertical sectional view taken on the broken line 2—2 of Fig. 1.
Fig. 8 is a detail horizontal vertical view taken on the line 8—8 of Fig. 7.
Fig. 15 is a detail sectional view taken on the line 15—15 of Fig. 2.

For connecting the drum 61 with the shaft 20 any suitable clutch mechanism may be employed, but as previously stated an automatic clutch is preferred and particularly one having the characteristics of the clutch construction shown in detail in Figs. 1 and 2 and including the clutch elements 69 in the form of semi-cylindrical shoes provided with a suitable lining 70 engageable when moved outwardly, with a drum 71 whose disk portion 72 is secured as by rivets 73 to a flange on the drum 61. A support 74 for the shoes has a hub portion 75 splined as at 76 to rotate with a flanged disk 77 secured to the crank shaft 20 by the bolts 21, a flanged nut 78 being mounted on the hub of said disk 77 and engaging the hub 75 to prevent endwise movement thereof. Each of the shoes or clutch elements 69 are generally channel shaped in cross section with rectangular pockets 79 formed centrally thereof to receive guide block extensions 80 formed as a part of the support 74. A thrust block 81 is slidably mounted at one end of each shoe and backed by relatively heavy springs 82 which permits relative movement between the block and the shoe after a certain predetermined pressure has been applied to the shoe, the springs being mounted in a housing formed between the shoe and a casing member 83. The sides of each shoe are provided with arcuate slots 84 in which a screw 85 on the block 81 works and by which the springs 82 for each thrust block 81 are put under a predetermined initial compression and the block is guided. The other end of each shoe 69 has a thrust block 86 fixed thereto. The shoes are moved to and held in a release position by the sets of release springs 87 anchored to the end portions of said shoes.

The shoes 69 are moved into clutched engagement with the drum 71 by a double toggle mechanism acting respectively on the ends of the shoes. Each double toggle includes a toggle formed by sets of links 88 and a toggle formed by a link 89 and a link 90. The link 90 is in the form of an equalizer member having its hub 91 mounted to rotate on the hub 75 of the support 74 and provided with diametrically disposed forked arms 92 pivotally connected by the pins 93 to one of the ends of the links 89. The other end of each of the links 89 is operatively connected or pivoted to the inner ends of each set of links 88 by pin 94. The outer ends of each of the links 88 has a thrust bolt 95 in adjustable threaded engagement therewith and held in adjusted position by a lock nut 96 and provided with a spherically curved head adapted to seat in a similarly curved recess in the adjacent thrust block 81 or 86. The ends of the shoes are also guided relative to each other by a block 97 secured to the end of one shoe and slidable in the end of the other shoe.

These toggles are operated by speed responsive elements, which are here shown as a lever 98 pivotally mounted on a pin 99 on the support 74 and having a weighted end 100 and a shorter arm 101 pivotally connected by a pin 102 to a link 103 which is operatively connected at its other end to the pin 93 by a lost motion connection through a slot 104 in the link 103, said levers being moved to release position in each instance by a coiled torsion spring 105, adjustably anchored at one end in one of the locking recesses of a plate 106 fast on the pin 99 and engaging the pin 102 at its other end. As shown in section in Fig. 15, the weighted end 100 of the lever 98 is provided with a bore 107 in which a detent 108 is slidably mounted and urged outwardly against the support 74 by a spring 109 backed by a plug 110 in threaded engagement with said bore, said detent adapted to engage in a recess 111 when the weighted lever is in expanded position so that these levers will be released with a definite and positive snap action.

Thus in the present instance when the engine shaft 20 is turning above its idling speed and reaches a certain predetermined speed, for example ten to fifteen miles per hour, the weighted ends 100 of the levers 98 swing outwardly under the action of centrifugal force and against the actions of the springs 105 and act through the links 103 and pins 102 upon the equalizer 90 which through the links 89 acts upon the toggle links 88 to move them toward a straight line position and thus act upon the thrust blocks 81 and 86 at the ends of the shoes 69 to gradually and smoothly bring said shoes into full driving engagement with the drum 71 but after this full driving engagement is established the weighted levers 98 will be locked by the engagement of the detents 108 with the recesses 111 so that they will remain in this position under a considerable reduction of the engine speed without losing their driving torque capacity and therefore unlike previous constructions slipping of the clutch and racing of the engine in the slower speeds of the vehicle is prevented and when the critical speed as for example, two miles per hour vehicle speed, is reached the clutch will release with a definite snap action. It is also to be noted that the springs 82 govern the amount of clutching pressure and permit relative movement between the blocks 81 and the shoes after a certain pressure has been applied to the shoes by the toggles through these blocks. Also, the lost motion connection afforded by the slots 104 for the pins 93 is of advantage as it permits of the initial release of the detents 108 from the recesses 111 before the weighted levers 98 move to a position so that link 103 can break the toggle joint between links 89 and 90. Thus this lost motion connection permits the full action of the weight release spring 105 on the weighted lever to release the detent 108 and then imparts enough momentum to break the toggle joints of the clutch applying mechanism from their applied position so that the springs 87 may release the shoes 69 from the drum 71.

From the foregoing it will be noted that when the engine clutch is engaged the drum 61 rotates with the shaft 20 and thus causes the rollers 63 to assume a driving position relative to said drum and the actuator 64 with the result that the shaft 30, and hence the gear 32, is then turned by the engine to drive the planetary gearing to provide the low or first speed drive.

While in low gear, the gear 58 being a part of the compound planet gears and in mesh with the gear 35 causes said gear 35 to turn in clockwise direction at a higher speed than the gear 48 associated therewith and at a predetermined speed, for example, ten to twelve miles per hour car speed, causes the operation of the speed responsive mechanism that connects the shaft 34 with the shaft 20 to obtain second speed through the epicyclic gear train as previously set forth, and permits of the automatic driving release of the shaft 30 through the overrunning action of the clutch rollers 63.

The second speed automatic clutch is identical with the automatic engine clutch previously described except that the detents that hold the weights in expanded position are adjusted to release at about three to four miles per hour car speed and that provision is also made for having these detents lock the centrifugally operated parts in a neutral or contracted position until a predetermined speed, for example ten to twelve miles per hour car speed is obtained. Briefly then, this clutch includes shoes 69', a support 74', toggle links 88' and 89', equalizer 90', links 103', weighted levers 98' and springs 105' similar respectively to the shoes 69, support 74, toggle links 88 and 89, equalizer 90, links 103, weighted levers 98 and springs 105 of the engine clutch and similarly arranged. The support 74' in this instance has a splined connection 112 with a sleeve 113 having a bearing bushing 114 surrounding a portion of the shaft 30. Unlike the engine clutch however, the weighted levers 98' are held in contracted position by detents (not shown) but similar to the detents 108 but which in addition to engaging in recesses similar to the recesses 111 also engage in recesses in the support 74' when said levers are in contracted position (or in the position of lever 98 shown in Fig. 2).

While is has been noted that the sleeve 113 is loose on the shaft 30 it is adapted to be connected to the second drive shaft 34 through clutch mechanism hereinafter described and when so connected it will be understood that when the speed of the drive shaft 34 reaches a certain value the weighted levers 98' of this second speed clutch move outwardly against the action of their springs 105' and through the links 103, equalizer 90', links 89' and 88' move the shoes 69' into engagement with a drum 115 which is secured to the flywheel 22 by bolts 116 so that the shaft 34 is then driven direct from the engine and through gears 35, 58, 60 and 48 establishing the second speed ratio for the driven shaft 41.

In the condition of the low and second speed as the change speed gear is of the planetary gear type there is a tendency for the planetary gear carrier to be revolved in the reverse direction to the driven gear and means are provided to utilize this tendency to automatically lock the planetary gear carrier against reverse movement which means are shown as a one way roller brake shown in Fig. 1 and similar to the clutch shown in Fig. 6 and which in the present instance is designed to act directly on the planetary carrier yet is readily released or rendered inoperative when the transmission is in neutral or reverse.

This mechanism includes an actuator 117 formed as a part of the hub of the planetary gear carrier and similar to the actuator 124, a brake drum 118 similar to the drum 123 and the brake members or rollers 119 cooperating with the actuator 117 in the usual manner to cause the rollers to be wedged between said actuator and the brake drum on the tendency of the planetary gear carrier to rotate backwards or anticlockwise as viewed towards the right in Fig. 1 and thus stop this backward rotation. However, it will be noted that where the planetary gear carrier is rotated in a clockwise direction by the driven member, it will release the rollers 119 from their braking engagement with the drum 118 which for the description thus far will be considered as stationary.

Thus, with the present construction while in low gear, the gear 58 causes the gear 35 to turn in a clockwise direction at a higher speed than the gear 48 and when the speed of the gear 35 and shaft 34 and consequently sleeve 113 then clutched thereto, support 74' and the speed responsive mechanism previously described reach a predetermined value so as to move shoes 69' into engagement with the drum 115, the drive then being from the shaft 20 through flywheel 22 and drum 115 to the shaft 34, the gear 35 begins to rotate at engine speed and therefore gears 58, 53 and 60 revolve at a higher speed and consequently gear 48 and shaft 41 are driven at a high or second speed. Under these conditions, gear 59 being of larger diameter and revolving at this instance at a higher rate of speed causes gear 32 to revolve faster than engine speed and such increase in speed, relatively speaking being the same as running the drum 61 backwards or in a counterclockwise direction, the rollers 63 of the overrunning clutch are released and, while shaft 30 is free to turn, the drive is from the engine through the second speed automatic clutch gears 35, 58, 60 and 48 to the shaft 41 with the vehicle in second speed.

It has been noted that the automatic brake mechanism preventing backward rotation of the planetary gear carrier may be released when the driven shaft relatively speaking reaches or exceeds the speed of the driver and this movement to brake disengagement position may be effected by the operator's partial deceleration of the engine temporarily so as to decrease the speed of the driver gear below that of the driven shaft 41 as by the operator's partial closure of the throttle valve of the engine. Consequently, when the vehicle is in second speed and the driver wishes to go into high speed or direct drive he partially decelerates the engine speed so that the driven shaft temporarily rotates faster than the driving element of the planetary gearing and the driven gear 48 becomes a driver tending to turn the engine through the planetary gearing including the gears 59, 32 or 58, 35 and in doing so releases the planet carrier from the automatic brake mechanism and turns said carrier in the same direction as that of the then driver but faster than said driver. The high speed or direct drive automatic clutch mechanism now to be described then operates to lock the planet gear to parts hereinafter described to connect it in driving relation with shaft 41 and the vehicle is then in high gear.

While any suitable automatic clutch may be used for the high speed clutch, I prefer to use a very simple form of speed responsive clutch, shown in detail in Figs. 1 and 8. This clutch includes an annular clutch member or internal gear 120 slidably splined to the toothed portion 121 of the hub 54 of the part 51 of the planetary gear carrier and hence revolving directly therewith and speed responsive means adapted to shift said gear 120 toward the right for engagement with a clutch member or gear 122 which is connected to the shaft 41 for forward drive and preferably through a one way roller clutch mechanism, shown in Figs. 1 and 6, comprising the hub 123 of the gear 122 which forms a clutch drum, an actuator 124 having a splined connection 125 with the driven shaft 41, and the clutch rollers 126 working between said actuator and drum. In Fig. 6 the rollers 126 are seen to work in notches 127 in the actuator 124 and cooperate with the inclined surfaces 128 thereof in the usual manner to cause the rollers to be wedged between said actuator and the drum 124 for forward drive of shaft 41, the rollers 124 being urged to clutching engagement by springs 129 acting on blocks 130 bearing against said rollers. However, if there is a tendency for the shaft 41 to rotate in the reverse direction under any conditions of operation then the rollers 124 will be free of the hub 123 which may then turn freely.

The speed responsive means for shifting the gear 120 into engagement with gear 122 comprises as shown in Fig. 8, a plurality of weights 131 having forked end portions 132 which straddle rods 133 slidably mounted in the parts 51 and 37 of the planetary gear carrier and each secured at one end to a shifter plate 134 and at the other carrying a readily accessible tension adjusting nut 135 and washer 136 with a spring 137 interposed between said washer and the part 37 of said carrier, the shifter plates 134 being mounted to work in an annular groove 138 in the clutch member 120. In the retracted position shown in Fig. 8 it will be noted that the forked ends 132 bear against one face of the disk or spider 51 but that under the influences of centrifugal force these weights 131 may swing outwardly about the points 139 adjacent the notches 140 and that in so doing the member 120 is moved toward the right through the force exerted by the weights upon the shifter plates 134 in opposition to the force imposed by the springs 137 upon these plates through the rods 133.

It is now to be noted that so long as the planetary gear carrier stands still which is the condition for low and second speed, the weights 131 cannot move and are held in contracted position by the restraining springs 137. When, however, the operator of the vehicle decides that he is going fast enough in gear and wishes to change to high gear or direct drive he decelerates the engine, as previously described, so as to permit the release of the automatic brake mechanism of the planetary gear carrier and allow it to rotate with its driven gear 48, but faster than said gear.

Under these conditions the weights 131 under the rotating action of the carrier swing or cant outwardly under the action of centrifugal force and against the resistance of the springs 137 and thus move the jaw clutch member 120 into engagement with the jaw clutch member 122 which is a part of the drum 123 of the one-way roller clutch mechanism above described and which drum then rotates freely since relatively speaking, the shaft 41 has reversed itself from said drum 123 allowing the rollers 126 to release themselves and rotate freely from said drum 123 with the jaw clutch engaged. Now, when after this temporary deceleration of the engine, the operator accelerates said engine it operates either through gear 32 or 35, as the case may be, to drive the gears 56, 59, 60 and 48 and the planetary carrier again tends to reverse itself from the direction of turning of the driven shaft 41 thereby causing a relative movement between the drum 123 and the actuator 124 so as to bring the rollers 126 into a wedged engagement between the parts 123 and 124 and since the drum 123 is then engaged with the clutch member 120 which is mounted on the hub 54 of the disk 51 of the carrier the whole unit rotates as one in the same direction as the driver and the vehicle is then in direct drive. While this action of the direct drive clutch requires a temporary change in speed of the engine it does not require any special shifting of gears or clutches by the operator.

When the vehicle is in high or direct drive, if its speed is diminished or slows down to such an extent as to permit the springs for the weights 137 to retract the same and thus release the clutch members 120 and 122, the one way automatic brake including the rollers 119 will again hold the planetary gear carrier stationary and the vehicle will then proceed in second or a lower gear and a further reduction in speed as for example to three or four miles per hour vehicle speed will cause the weighted levers 98' of the second speed clutch to move to contracted position and hence release the shoes 69' from the drum 115 and the vehicle will then proceed in low gear.

Furthermore, according to the present invention, the tension of the springs 137 can be so adjusted that when the planetary gear carrier is revolved at a rate of car speed as low as five miles per hour the weights 131 will be operated to apply the high speed or direct drive clutch and by this arrangement permits automatic shifting from low gear to high or direct drive without going through second. This is of great advantage to a driver in going through congested traffic where he cannot make any faster than about a five mile speed but does not like to be in low or second and feel the unpleasant racing of the motor when in gear at such speeds. Thus with the present invention the driver while in low gear may immediately proceed in high or direct at a low car speed, upon a temporary reduction of speed of the drive shaft below that of the driven shaft, the high speed clutch having a smooth engagement in the lower speeds as well as in the higher speeds though it will be understood that the operator may go into second from low before going into high as previously described.

It is sometimes highly desirable in driving to change immediately from high to second and in order that the operator with the present automatic shift may not have to wait for a reduction in speed of the vehicle to effect this change, means have been provided, under the control of the operator for immediately placing the vehicle in second gear while proceeding at high speed. For this purpose the gear 122 is slidably splined on the shaft 41 and may be shifted by the operation of the foot pedal 192 hereinafter described from its normal engageable position to its neutral position shown in Fig. 1 out of mesh with the clutch gear 120 and hence allow the vehicle to proceed immediately in second gear regardless of the high speed at which the vehicle is travelling. After this operation and while the operator is accelerating the motor the clutch gear 122 may be allowed to move from its then neutral position back toward the left to a normal engageable position, because under these conditions the planet gear carrier is then stationary and the weights have contracted and the clutch member 120 is out of reach of the gear 122 and as a result, the second speed gear ratio will be maintained. However, at any time the driver decelerates the engine again the direct drive clutch again becomes operative to establish the clutch relation between the clutch members 120 and 122 to put the vehicle in high gear.

It is also to be noted that when the clutch member 122 is moved to neutral position while the vehicle is in direct drive at a car speed below ten or twelve miles per hour that the vehicle will then be immediately in low gear.

Figure 3:
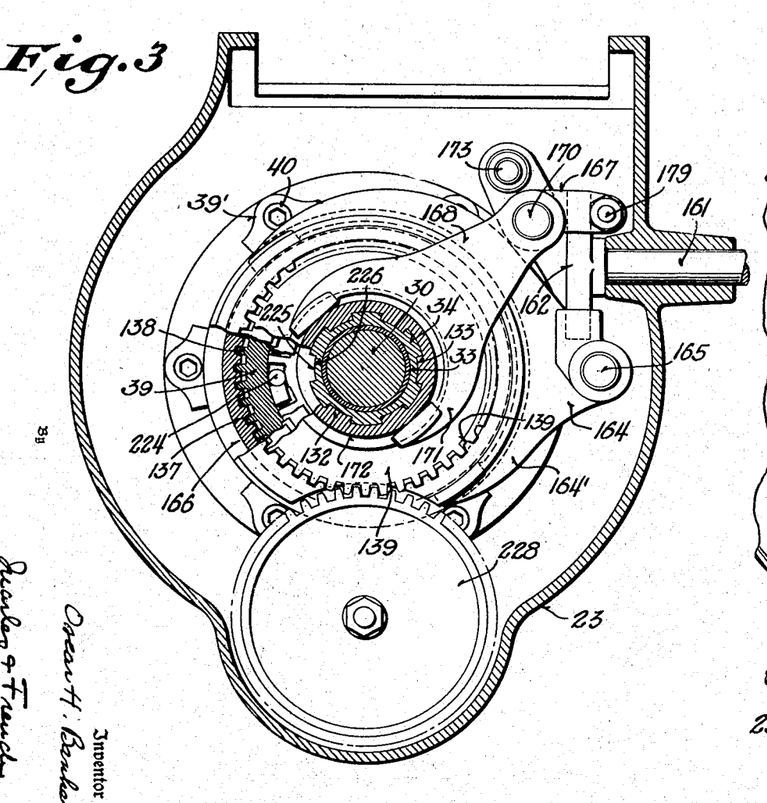
Fig. 3 is a detail vertical sectional view taken on the broken line 3—3 of Fig. 1.

It has been previously pointed out that the second speed clutch mechanism is free to float on the shaft 30 as the sleeve 113 is free to turn thereon and that said sleeve is adapted to be connected to the drive shaft 34 by clutch mechanism which as shown in Figs. 1 and 3 includes a clutch gear on member 131 formed on said sleeve and a shiftable clutch member 132 slidably splined at 133 on the shaft 34 and provided with an internal gear or clutch portion 134 adapted to mesh with the member 131 when moved toward the left from its neutral position shown in Fig. 1, these clutch members being engaged for forward and reverse drive. The disconnection of these clutch members prevents creeping action of the vehicle when the transmission is in neutral and also permits racing the engine and applying the torque through the gearing as hereinafter described.

Figure 4:
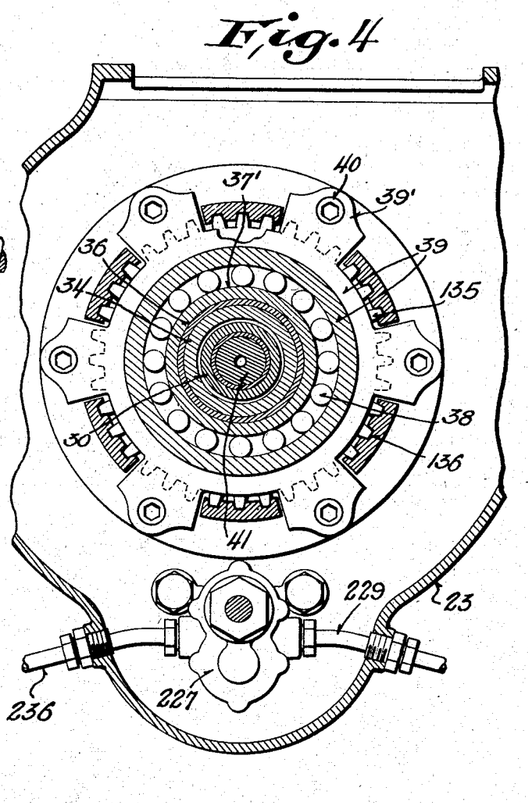
Fig. 4 is a detail vertical sectional view taken on the broken line 4—4 of Fig. 1.

It has been previously noted that the brake drum 118 of the planetary gear carrier is free to rotate in its bearing in the end plate 24 but for forward drive this drum is held against rotation by providing a clutch gear 135 on said drum adapted to be engaged with toothed segmental portions 136 formed as an internal clutch portion at the right hand end of a shiftable clutch member 137, see Figs. 1 and 4, these clutch portions 136 being disposed between the attaching lugs or ears 39' of the fixed member 39. The movable clutch member 137 has internal teeth meshing with the teeth 138 formed on the member 39 so that it is slidably splined thereto.

For effecting the reverse drive through the epicyclic gear train, means have been provided for holding the shaft 34 against rotation while allowing the planetary carrier to rotate freely and for controlling the one-way brake mechanism of the planetary carrier to allow its reverse rotation.

For holding the shaft 34 against rotation the member 137 is adapted to be moved toward the left as viewed in Fig. 1 along its splined connection with the member 39 so that its internal clutch teeth will mesh with the teeth 139 of a gear formed as a part of the clutch member 132 and under these conditions since said clutch member 137 has already been moved out of engagement with clutch gear 135 of the brake drum 118 for the planetary carrier, said carrier will be free to rotate and said brake will be inoperative.

Thus with this arrangement since members 39 and 139 do not rotate when teeth 136 are in mesh with the clutch gear 135, the drum 118 cannot rotate and this is the condition for forward drive. When however the clutch member 137 is moved toward the left to disengage this brake drum clutch, as when said member 137 is moved along the teeth 138 to put the transmission in neutral or is moved to bring it into engagement with the clutch gear 139 for reverse, then the brake drum 118 will be free to turn and hence the planetary gear carrier will be free to turn in either the neutral or reverse condition of the transmission.

It is sometimes desirable to maintain the vehicle in second so as to permit the engine to act as a brake while descending steep grades and also it is desirable under certain other conditions met with in driving to hold the planetary gear carrier against rotation where the transmission is in neutral and the second speed gearing is prevented from operating though the release of the second speed clutch mechanism. In either of these situations I have provided a manually controlled brake mechanism for holding the planetary gear carrier against rotation which is shown in Figs. 1, 6 and 7.

This mechanism includes a brake drum 140 having flanged portions secured to the disk 51 of said carrier as by rivets 140', a brake band 141 of conventional form of the external contracting type, one end 142 adjustably secured by a bolt 143 pivotally connected to one arm of a lever 144 fixed to an oscillatory shaft 145, the other arm of said lever being connected to the other end of said band by a pin 146, the band being of the lined spring metal type held in a release position by the adjustable stop screws 147, and an actuating lever 148 being secured to the shaft 145. This lever 148, shown in Fig. 7 as mounted on the extended end of the shaft 145 and as shown in Figs. 9 and 12 to 14, on actuation turns the shaft 145 to swing the lever 144 counterclockwise to reduce the effective distance between the ends of the band to apply the brake to the drum 140.

It is known that with a planetary type transmission, when the driven gear drives the driver, the planetary carrier revolves in the same direction as that of the driver and faster than the driver gear and by the use of the brake above described when the clutch member 120 is released from the driven shaft 41 under conditions of forward drive, thus putting the vehicle in second speed, this speed may be maintained for locking purposes only or braking the car by the engine as long as desired by the application of the brake band 141 to the drum 140.

There are some occasions when a vehicle has to negotiate difficult or uneven ground when it is necessary to utilize all the available torque of the engine in low gear as for example to get one or more of the wheels out of a hole or depression and on such occasion the members 132 and 137 are shifted to put the transmission in neutral and thus prevent operation of the second speed clutch and free the planetary gear carrier and then race the engine to build up torque and while it is in this condition, gradually apply the band 141 to the drum 140 and apply the power to the gearing and then hold the planetary carrier and deliver the full torque of the engine through the low speed of transmission to the shaft 41. Thus, with this construction it is possible to drive in first speed with the same effect as in a conventional drive transmission and without the automatic second and high speed clutches. After this operation however, in order to again bring the transmission into condition for normal driving, the brake 140 is released and the members 132 and 137 shifted into position for normal driving whether the vehicle is standing still or moving at slow speed.

The controls for putting the vehicle into running position, into second gear directly while travelling in high, into reverse, and for holding the vehicle in second or low gear will now be described.

Referring to Figs. 9 to 14, the numeral 149 designates the dash of the vehicle and 150 an engager, the same being of the type shown in my application Ser. No. 552,860 wherein the rod 151 is slidably and rotatably mounted in a casing 152 secured to the dash and carries a pin 153 which works longitudinally in a slot (not shown) in said casing in transverse notches in said casing designated by the letters F. N. and R. (forward neutral, reverse). The engager may be released from any one of its positions by turning the same to move the pin 153 out of one of the notches and to a position in line with the longitudinal slot and then moving it forwardly or backwardly and thereafter turning it to engage in the desired notch.

The engager rod 151 is connected through a swivel joint connection 154 (not shown in detail) to a link 155 which connects it with a lever 156 pivoted at 157 to a bracket 158 on the dash. The lever 156 is operatively connected by a link 159 to a crank arm 160 on a control shaft 161 journalled in the casing section 23 and carrying a lever 162. Referring to Figs. 3 and 7, it will be noted that the lower rounded end of the lever 162 works in a slot 163 in a shifter fork 164 slidably mounted on a fixed guide shaft 165, the ends 164' of this fork engaging an annular groove 166 in the clutch member 137. The upper rounded end of the lever 162 is arranged to engage an arm 167 of shifter fork 168 whose hub 169 is slidably mounted on a fixed guide shaft 170, the ends of this fork engaging in an annular groove 171 in the clutch member 132. The hub 169 of the fork has an arm 172 slidably mounted on a fixed rod 173 mounted in the plate 24, a compression spring 174 being interposed between the arm 172 and the collar 175 fixed to the shaft 173, said spring therefore acting to normally move the shifter fork 168 to a neutral position and at the same time swing the lever 162 to shift the shifter fork 164 to a neutral position.

The shaft 145 has the hub of a shifter fork 176 slidably mounted thereon and the ends 177 of this fork engage in an annular groove 178 in the clutch member 122. A rod 179 is clamped at one end 180 to the arm 167 and is slidably mounted in a bore 181 in the casing section 25 and has a reduced end portion 182 extending through a lug 183 on the hub of the fork 176 and providing a shoulder 184 against which said lug is normally held by a spring 185 mounted on the end 182 between said lug and a collar 186 fast to said end. The spring 185 normally acts on the lug 183 to hold the shifter fork 176 against the shoulder 184 so that this fork will be in a neutral position when the forks 164 and 168 are in neutral position and so that this fork 176 will be shifted toward the left for forward drive position when the forks 168 and 164 are shifted to their forward drive position though this fork 176 may also be independently shifted toward the right along the rod 145 and the end 182 by the engagement of a lever 187 with the lug 183.

The lever 187 is mounted on an oscillatory shaft 188 extending through the casing 25 and carrying lever 189 operatively connected by a link 190 with the lower arm 191 and a pedal lever 192 loosely pivoted on the control shaft 161, said pedal being normally urged to release position against a stop 193 by a spring 194.

Figure 9:
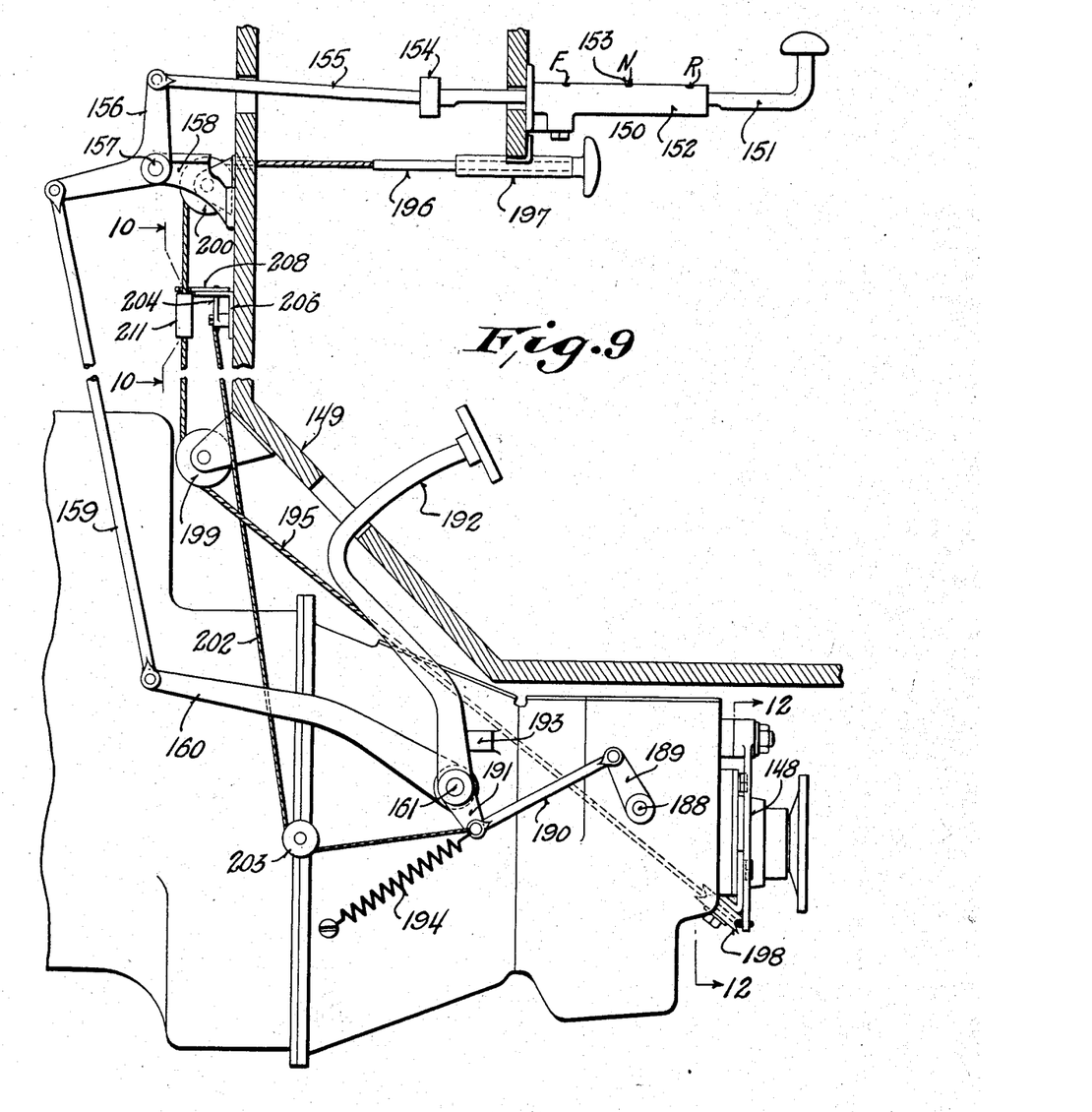
Fig. 9 is a side elevation view of the transmission embodying the invention showing its installation in an automatic vehicle.
Figures 10, 11, 12, 13:
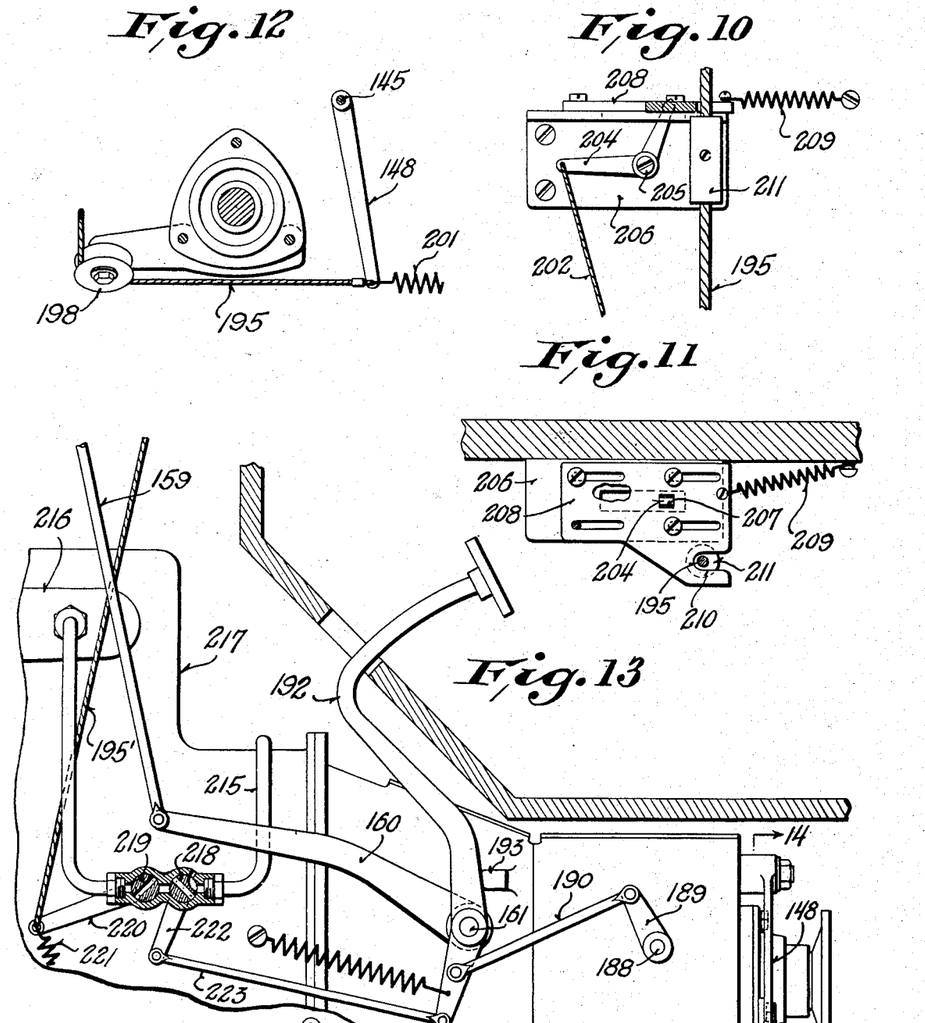
Fig. 10 is a detail sectional view taken on the line 10—10 of Fig. 9.
Fig. 11 is a plan view of parts shown in Fig. 10.
Fig. 12 is a detail vertical sectional view taken on the line 12—12 of Fig. 9.
Fig. 13 is a view similar to Fig. 9 showing certain modifications, parts being broken away.

The brake operating lever 148 may be manually or power operated. As shown in Figs. 9 and 12 a cable 195 connects the free end of said lever with a pull rod 196 slidably mounted in a guide 197 on the instrument board of the dash, the cable being guided by the pulleys 198, 199 and 200, a spring 201 also acting on said lever tending to move it to a release position. When the operator grasps the knobed end of the rod 196 and pulls outwardly the cable 195 will act to swing the lever 148 and shaft 145 to apply the band 141 to the drum 140. In order to prevent operating this brake before operating the pedal 192 to disconnect the clutches 120 and 122 an interlock is provided comprising as shown in Figs. 9 to 11, a cable 202 connected at one end to the lower end of the pedal 192, guided over a pulley 203 and connected at its other end to one arm of a bell crank lever 204 pivoted at 205 on a bracket 206 secured to the dash. The other end of this lever 204 extends through a slot 207 in a locking plate 208 slidably mounted and guided on the bracket 206 and normally urged to locked position by a spring 209. The plate 208 has a notch 210 in it which permits it to move over the cable 195 to the position shown in drawings where it forms a stop opposing the upward movement of a block 211 secured to said cable 195 and hence said cable. Until the depression of the pedal 192 acting through the cable 202 and lever 204 moves the plate 208 out of interfering position with the block 211, the cable 195 can not be pulled upwardly to operate the lever 148. When however the cable 195 has been pulled upwardly to move the lever 148 to brake engaging position the block 211 will then be above the plate 208 and then if the operator releases the pedal 192 the plate 208 will be moved back to form a stop to engage the block 211 and thus prevent the release of the brakes and permit the release of the pull rod 196 so that the brake 141 for the second or low speed conditions of driving may be maintained in this condition.

Figure 14:
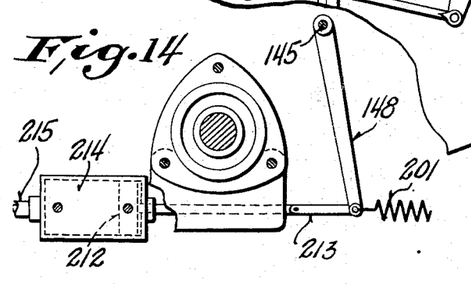
Fig. 14 is a detail vertical sectional view taken on the line 14—14 of Fig. 13.
Figure 16:
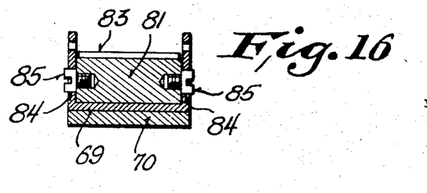
Fig. 16 is a detail sectional view taken on the line 16—16 of Fig. 2.

For operating the brake lever 148 by power I have shown in Figs. 13 and 14 a suction operated motor whose piston 212 is operatively connected by a rod 213 with the free end of said lever and whose cylinder 214 has a connection with a suction pipe 215 connected with the intake manifold 216 of the engine 217 and having control valve mechanism mounted therein comprising a three-way valve 218 and a valve 219. The valve 219 is a simple rotary valve having an exterior disposed operating arm 220 connected to a cable 195' corresponding to the previously described cable 195 and operated to open the valve by a rod (not shown) similar to the rod 196 and similarly arranged, a spring 221 operating to close said valve. The valve 218 is a simple three-way valve of the rotary type adapted to connect the brake cylinder 214 either with the intake or with atmosphere and has an exteriorly disposed operating arm 222 operatively connected by a link 223 with the pedal lever 192. As shown in Fig. 13 the opening of valve 219 will not establish the suction connection between the cylinder 214 and the manifold 216 until the valve 218 has been operated by the depression of the pedal 192 so that in this instance the valve 218 provides an interlock to prevent the operator applying the brake to the planetary carrier until he depresses the pedal 192 which we have seen disconnects the clutch members 120 and 122.

From the above described arrangement of controls when the engager 151 is shifted from neutral position shown in Fig. 1, to a forward position the shaft 161 is turned counterclockwise as viewed in Figs. 7 and 9 and this as we have seen brings clutch gears 131 and 134 into engagement and clutch member 137 with its teeth 136 into engagement with the gear 135 and shifts clutch member 122 toward the left into a position where it may be engaged by the clutch member 120 of the high speed clutch. Thus the second speed and high speed clutch mechanism are in a condition to be operated and when the drum 118 of the planetary gear carrier is held against rotation so that its brake clutch is rendered operative and forward drive of the vehicle is established. If now, the operator while proceeding in high, desires to go into second, without changing the speed of the vehicle while in high he presses down on the foot pedal 192 which through the linkage previously described turns the shaft 188 and moves the shifter fork 176 to disengage the clutch member 122 from the member 120 and the vehicle is then in second and will remain in second so long as he keeps the pedal 192 depressed and if he desires to use the engine as a brake in second he applies the brake band 141 to the drum 140 by operating either the cables 195 or 195'.

When the operator shifts the engager 151 back to neutral the clutches above described are moved to the position shown in Fig. 1 it being noted that under these conditions the clutch member 122 has been moved to the right farther than it is moved through the operation of the pedal 192. When shifted to this neutral position the operator may as previously described apply the brake to the drum 140 to utilize the full torque of the engine in low.

When the operator shifts the engager 151 from neutral to reverse position the shaft 161 is turned clockwise thereby moving the clutch member 137 so that its teeth engage the clutch gear 139 and the clutch members 132 and 122 are then in the same position as in neutral since the spring 174 holds the shifter fork 168 in this position and through the rod 179 holds the shifter fork 176 in this position, the upper end of the lever 162 then swinging clockwise away from the member 167.

From the foregoing it will be noted that I have provided mechanism for operating the clutch member 122 both from the engager and pedal 192 without interfering with each other.

When the vehicle is standing on a hill or in a position where it may roll backwards when the transmission is in position for forward drive in order to prevent such backward movement I have provided an automatic one way brake similar to that for holding the planetary carrier against retrograde movement. This brake as shown in Figs. 1 and 3 includes a drum formed by the inner face of the member 39, spring pressed rollers 224 engageable with the drum under the action of an actuator 225 having a splined connection at 226 with the shaft 34 in which connection a certain amount of lost motion between the splines is preferred in order to readily release the clutch. For forward drive the rollers 224 are automatically released but, when through a tendency of the vehicle to drive the engine from the transmission, the shaft 34 is rotated in a reverse direction, the rollers 224 engage the member 39 which is stationary and prevent this action and hence the backward movement of the vehicle.

Due to the centrifugal force when the transmission is running in high gear or direct drive the oil from within the parts of the device is thrown off and later when the gears are brought into action there will be no oil to lubricate the working parts and rapid wear will occur. To overcome this trouble the lubricating oil should be fed by force from the center of the device and distributed to its many outer points by the action of centrifugal force. In my previous constructions the crank shaft of the engine was drilled so that the engine lubricating oil could be circulated through the transmission and returned back to the engine again but this method was objectionable as the engine oil soon becomes contaminated by carbon and gasoline so that it makes a poor lubricant for gears. With the present arrangement the regular gear lubricant can be used and is completely isolated from the engine lubrication system, means being provided for supplying the gear box formed by the casing section 25 with its own oil. For this purpose a rotary gear type oil pump 227 is mounted in the housing section 23 and is driven by a gear 228 on one of its shafts constantly meshing with the clutch gear 139 regardless of its position. (See Fig. 1.) A discharge pipe 229 from the pump extends out of the casing section 23 and around into the casing section 25 for connection with a fitting 230 shown in Figs. 1 and 5 which has a duct 231 that communicates with a duct 232 in the shaft 41 and also with an outlet 233 controlled by a spring pressed relief valve 234. The outlet 233 discharges through a port 235 into the interior of the casing section 25 from which the oil is taken by a pipe 236 back to the suction sides of the pump. The duct 232 in the shaft 41 communicates with a centrally disposed bore 236' in said shaft which as seen in Fig. 1 supplies the lubricant through a transverse duct 237 to ducts in the shafts 30 and 34 and their bearing bushings, and the ducts 238 of the planetary carrier communicating with ducts in the shafts 55 for lubricating the bearings of said shafts, the oil after passing through these passages returning by way of the casing 25 and pipe 236 to the pump.

The general operation of the transmission and its control by the operator is simple. With the vehicle at rest and the engager 151 in neutral position, the operator starts the engine in the usual manner. After the engine has run for a period sufficient to warm it up, it is throttled down to idling speed and the operator shifts the engager from neutral to forward drive where it stays under all ordinary conditions of driving. The operator then proceeds from first to second gear automatically and from second to high as has been described in connection with the so-called high speed automatic clutch mechanism but as previously noted with the present construction, he may go from low direct to high or direct drive without going through second and without shifting any levers or manually operated clutches. If while in high gear or direct drive he wishes to immediately proceed in second or low depending upon his car speed, he operates the pedal 192 and if for any reason he desires to use the engine as a brake in second he applies the brake member 141 to the drum 140 to hold it against rotation. His changing from second to high or low to high is accomplished by the temporary reduction in speed of the drive shaft over that of the driven shaft and dependent on the then speed of the drive shaft. If he desires to reverse the vehicle he moves the engager 151 to reverse position when the car is standing still and then the engine is connected to drive the transmission in reverse. If he gets into a bad hole he moves the engager to neutral position and on racing the engine applies the brake 141 as previously described.

If in an emergency as through failure of some of the engine parts or other cause it is necessary to disconnect the engine from the vehicle, the operator simply moves the engager 151 to a neutral position and thus completely disconnects the transmission from the engine.

I desire it to be understood that this invention is not to be limited to any particular form or arrangement of parts except in so far as such limitations are included in the claims.

What I claim as my invention is:

1. In a change speed transmission, the combination of a drive shaft, a driven shaft, automatically variable change speed transmission mechanism for progressively changing the gear ratio between the drive and driven shafts from low to second to direct drive or from low directly to direct drive including an automatic speed responsive clutch mechanism operable upon a temporary reduction in speed of drive shaft relative to the driven shaft, said automatic clutch mechanism including a jaw clutch and centrifugally operable means for moving one of the elements of said jaw clutch whether said drive shaft is at a low or higher speed.

2. In a change speed transmission mechanism, the combination of a drive shaft, a driven shaft and change speed transmission mechanism between said shafts including reduction gearing and speed responsive clutch mechanism operable to connect said gearing to revolve with said drive and driven shafts, said speed responsive clutch mechanism including a disconnectible clutch in which both elements are independently shiftable into and out of engagement with each other, one of said elements in response to a change of speed, the other of said elements by the operator.

3. In a variable speed transmission mechanism wherein planetary gearing including a planetary gear carrier and clutch mechanism connect a drive shaft with a driven shaft, clutch mechanism for direct drive having one of its clutch elements mounted on the planetary gear carrier, the other clutch element being manually disconnectible and having an overrunning clutch drive connection with the driven shaft.

4. In a change speed transmission mechanism the combination of a drive shaft, a driven shaft and change speed transmission mechanism between said shafts including reduction gearing and speed responsive clutch mechanism operable to connect said gearing to revolve with said drive and driven shafts, said speed responsive clutch mechanism including a disconnectible clutch in which both elements are independently shiftable, one of said elements in response to speed changes, the other of said elements by the operator, said last named element including a one-way clutch for connecting said element in driving relation with the driven shaft.

5. In a transmission mechanism, the combination of a planetary gearing including a planetary gear carrier having a hub, a clutch member slidably splined to said hub, centrifugally operable means dependent upon the rotation of said carrier for shifting said clutch member, and a clutch member operatively connected to the driven shaft and adapted to mesh with said shiftable clutch member.

6. In a change speed transmission, the combination of a change speed planetary gearing including a planetary gear carrier having a hub, speed responsive clutch mechanism for connecting said carrier to revolve with said driven shaft including a jaw clutch element slidably splined to the hub of said carrier and a jaw clutch element slidably splined to said driven shaft.

7. A change speed transmission mechanism comprising a drive shaft, a driven shaft and a single planetary gear unit connecting said shafts including a pair of drive shafts, speed responsive clutch mechanisms for each of said drive shafts for establishing low and second gear ratios through said gearing, and means comprising a disconnectible clutch for completely releasing said second speed clutch mechanism from its drive shaft.

8. In a change speed transmission, the combination with the engine shaft, of a pair of drive shafts, a driven shaft, a single planetary gear unit between said drive shafts and driven shaft, including a planetary gear carrier, means for connecting one of said drive shafts with the engine shaft, speed responsive clutch mechanism loosely mounted on said last named drive shaft for connecting the other of said drive shafts with the engine shaft, and a shiftable jaw clutch for connecting said speed responsive clutch mechanism to its drive shaft.

9. In a change speed transmission mechanism, the combination of a drive shaft, a driven shaft, change speed planetary gearing between said shafts including a planetary gear carrier, clutch mechanisms operable to establish the different speed ratios of said gearing including a second speed, speed responsive clutch, means for completely disconnecting said second clutch on putting the mechanism in neutral at any speed, and means for holding the planetary gear carrier stationary while in neutral and said second speed clutch mechanism is disconnected for utilizing the full torque of the engine in first speed through said gearing to drive said driven shaft.

10. In a change speed transmission mechanism, the combination of a drive shaft, a driven shaft, change speed planetary gearing between said shafts including a planetary gear carrier, clutch mechanism operable to establish the different speed ratios of said gear including a second speed, speed responsive clutch, a disconnectible jaw clutch for connecting said last named clutch to its drive including a shiftable clutch element, automatic brake mechanism for preventing backward rotation of the planetary gear carrier when in gear, a disconnectible jaw clutch for releasing said brake mechanism in the neutral or reverse condition of the transmission including a clutch member shiftable for reverse into engagement with the shiftable clutch element of said first named jaw clutch when said element is in neutral position.

11. In a change speed transmission mechanism, the combination with the engine drive shaft and a driven shaft, of a single planetary gear unit between said shafts including a planetary gear carrier and a pair of transmission drive shafts, means for connecting the engine drive shaft with one of said transmission drive shafts, speed responsive clutch mechanism for connecting the other of said transmission drive shafts with the engine drive shaft, a disconnectible clutch for completely releasing said speed responsive clutch mechanism from its drive shaft, automatic brake mechanism for the planetary gear carrier to prevent backward rotation, clutch mechanism for releasing said automatic brake mechanism, speed responsive clutch mechanism for connecting said planetary gear carrier with said driven shaft for direct drive, and means for completely disconnecting said last named clutch mechanism from the driven shaft.

12. In a change speed transmission mechanism, the combination of an engine drive shaft, a driven shaft, a single planetary gear unit between said shafts including a planetary gear carrier and a pair of transmission drive shafts, speed responsive clutch mechanisms for progressively connecting said transmission drive shafts to the engine drive shaft for the low and second speed gear ratios, automatic brake mechanism for the planetary gear carrier to prevent backward rotation, speed responsive clutch mechanism for connecting said planetary gear carrier with said driven shaft for direct drive, and means for disconnecting the second and direct drive speed responsive clutch mechanisms and said brake mechanism to put the transmission in neutral regardless of engine speed.

13. In a change speed transmission mechanism, the combination of a sectional casing, one section providing a gear box, a transmission drive shaft mounted in another section, a shiftable clutch member for said drive shaft, a lubricant pump mounted in said last named section, a gear connection between said clutch member and pump for driving said pump, and means for supplying the oil from the pump to the parts within said gear box.

14. In a change speed transmission mechanism, the combination of a plurality of drive shafts, a driven shaft, a multi-speed gear unit between said drive shafts and said driven shaft, automatic speed responsive clutches for connecting said drive shafts through said gear unit with said driven shaft for second speed and direct drive and disconnectible means under the control of the operator to selectively put the transmission in second or low gear ratio regardless of the speed of the vehicle when in high, said means also adapted to be connected to establish normal driving without reducing the speed of the driven shaft.

15. In a change speed transmission mechanism, the combination of an engine drive shaft, a transmission drive shaft, speed responsive clutch mechanism for connecting said engine drive shaft to said transmission drive shaft; a driven shaft, automatically variable change speed transmission mechanism for progressively changing the gear ratio between said drive and driven shafts from low to second to direct drive including automatic speed responsive clutches, and means for respectively releasably holding said engine drive shaft clutch and second speed clutch in engaged positions until a lower speed than their engaging speed is reached, the release of said holding means for said second speed clutch occurring at a higher speed than that for said engine clutch.

16. In a change speed transmission device, the combination of a drive shaft, a driven shaft, change speed transmission mechanism between said shafts including a planetary gear carrier, a disconnectible clutch between said planetary gear carrier and said driven shaft, manually operated means for operating said clutch, a brake for said planetary gear carrier, means for operating said brake, and an interlock between said manually operated means and said means for operating said brake to prevent the operation of said last named means before said manually operated means.

17. In a change speed transmission, the combination of a drive shaft, a driven shaft, automatically variable change speed transmission mechanism for progressively changing the gear ratio between the drive and driven shafts from low to second to direct drive or from low directly to direct drive including an automatic speed responsive clutch mechanism for establishing direct drive operable upon a temporary reduction in speed of the drive shaft relative to the driven shaft whether the drive shaft is at a low or higher speed.

18. In a change speed transmission, the combination of a drive shaft, a driven shaft, automatically variable change speed transmission mechanism for progressively changing the gear ratio between the drive and driven shafts from low to second to direct drive or from low directly to direct drive including an automatic speed responsive jaw clutch mechanism for establishing direct drive operable upon a temporary reduction in speed of the drive shaft relative to the driven shaft whether the drive shaft is at a low or higher speed.

OSCAR H. BANKER.